United States Patent
Cho et al.

(10) Patent No.: US 11,437,647 B2
(45) Date of Patent: Sep. 6, 2022

(54) ELECTROLYTE FOR SECONDARY BATTERY AND LITHIUM SECONDARY BATTERY INCLUDING THE SAME

(71) Applicant: SK Innovation Co., Ltd., Seoul (KR)

(72) Inventors: In Haeng Cho, Daejeon (KR); Hyo Shin Kwak, Daejeon (KR); Dai In Park, Daejeon (KR); Jin Haek Yang, Daejeon (KR); Joo Hyun Lee, Daejeon (KR); Myoung Lae Kim, Daejeon (KR); Sung Yon Oh, Daejeon (KR); Su Hee Han, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 379 days.

(21) Appl. No.: 16/596,813

(22) Filed: Oct. 9, 2019

(65) Prior Publication Data
US 2020/0119398 A1    Apr. 16, 2020

(30) Foreign Application Priority Data

Oct. 11, 2018    (KR) ........................ 10-2018-0121217

(51) Int. Cl.
| | | |
|---|---|---|
| *H01M 10/0567* | (2010.01) | |
| *H01M 10/052* | (2010.01) | |
| *H01M 10/0569* | (2010.01) | |

(52) U.S. Cl.
CPC ..... *H01M 10/0567* (2013.01); *H01M 10/052* (2013.01); *H01M 10/0569* (2013.01); *H01M 2300/0025* (2013.01)

(58) Field of Classification Search
CPC .......... H01M 10/0567; H01M 10/052; H01M 2300/0025
See application file for complete search history.

(56) References Cited

U.S. PATENT DOCUMENTS

| | | |
|---|---|---|
| 5,688,847 A | 11/1997 | Gelbin et al. |
| 5,919,966 A | 7/1999 | Marlin |

FOREIGN PATENT DOCUMENTS

| | | | |
|---|---|---|---|
| KR | 20170018739 | * | 2/2017 |
| KR | 1020170018739 A | | 2/2017 |

* cited by examiner

*Primary Examiner* — Jayne L Mershon
(74) *Attorney, Agent, or Firm* — The Webb Law Firm

(57) ABSTRACT

Provided are an electrolyte for a secondary battery including a lithium salt, a nonaqueous organic solvent, and a bisfluorophosphite multicyclic compound, and a lithium secondary battery including the electrolyte.

16 Claims, No Drawings

ELECTROLYTE FOR SECONDARY BATTERY AND LITHIUM SECONDARY BATTERY INCLUDING THE SAME

CROSS-REFERENCE TO RELATED APPLICATION

This application claims priority to Korean Patent Application No. 10-2018-0121217 filed Oct. 11, 2018, the disclosure of which is hereby incorporated by reference in its entirety.

TECHNICAL FIELD

The following disclosure relates to an electrolyte for a lithium secondary battery and a lithium secondary battery including the same.

BACKGROUND

Recently, as portable electronic devices have been widely popularized and have been becoming smaller, thinner, and lighter, research on a secondary battery used as a power source thereof, which has a small size, is lightweight, and may be charged and discharged for a long time, has also been actively conducted.

The lithium secondary battery generates electrical energy by oxidation and reduction reactions when lithium ions are intercalated into and deintercalated from a cathode and an anode, uses materials capable of intercalating and deintercalating lithium ions as the anode and the cathode, and is manufactured by charging an organic electrolyte or a polymer electrolyte between the cathode and the anode.

The organic electrolyte which is currently widely used may include ethylene carbonate, propylene carbonate, dimethoxyethane, gamma-butyrolactone, N,N-dimethylformamide, tetrahydrofuran, acetonitrile, or the like. However, since the organic electrolyte generally easily volatilizes and is highly inflammable, when the organic electrolyte is applied to the lithium ion secondary battery, there were problems in stability at a high temperature, such as ignition due to internal short circuit at the time of internal heat generation by overcharge and overdischarge.

In addition, the lithium secondary battery is intercalated into carbon by moving lithium ions released from the lithium metal oxide, which is a cathode, to a carbon electrode, which is an anode, during initial charging. In this case, since the lithium ions are highly reactive, the lithium ions react with the surface of the carbon particle, which is the anode active material, and electrolyte to form a coating, called a solid electrolyte interface (SEI) film, on the surface of the anode.

Performance of the lithium secondary battery greatly depends on a composition of the organic electrolyte and the SEI film formed by the reaction of the organic electrolyte and the electrode. That is, the SEI film formed inhibits a side reaction of a carbon material and an electrolyte solvent, for example, decomposition of the electrolyte on the surface of the carbon particle which is an anode, prevents collapse of anode materials due to co-intercalation of the electrolyte solvent into the anode materials, and also fulfills the conventional role as a lithium ion tunnel, thereby minimizing battery degradation.

Accordingly, various studies for developing a new organic electrolyte including various additives for stabilizing the SEI film have been attempted.

Meanwhile, as a cathode active material of the lithium secondary battery, a lithium-containing cobalt oxide (LiCoO$_2$) is mainly used, and additionally, a lithium-containing manganese oxide such as LiMnO$_2$ having a layered crystal structure and LiMn$_2$O$_4$ having a spinel crystal structure, and a lithium-containing nickel oxide (LiNiO$_2$) are also used.

A LiNiO$_2$-based cathode active material shows a rapid phase transition of a crystal structure depending on a volume change accompanied by a charge-discharge cycle, and when the LiNiO$_2$-based cathode active material is exposed to air and moisture, chemical resistance on the surface thereof is rapidly deteriorated, and an excessive amount of gas is produced during storage or cycles, and thus, due to these problems, commercialization thereof is currently limited.

Thus, a lithium transition metal oxide in which nickel is partially substituted by other transition metals such as manganese and cobalt has been suggested. The metal-substituted nickel-based lithium transition metal oxide has an advantage of better cycle characteristics and capacity characteristics, but in this case also, in long-term use, the cycle characteristics are rapidly deteriorated and the problems such as swelling by gas produced in the battery and low chemical stability, are not sufficiently solved. In particular, a lithium nickel-based transition metal oxide having a high content of nickel produces an excessive amount of gas during storage or a cycle, so that the battery shows a severe swelling phenomenon and has low stability at a high temperature.

Accordingly, in order to solve the problem of stability at a high temperature while using the lithium nickel-based cathode active material which is appropriate for a higher capacity, a solution to improve life characteristics and stability at a high temperature of a battery by adding vinylene carbonate, vinyl ethylene carbonate, or the like which is known in the art as an electrolyte additive to form the SEI film has been suggested.

However, when these materials are used for a battery including the nickel-based lithium transition metal oxide as a cathode active material, there was a problem that the swelling phenomenon and deteriorated stability at a high temperature became more serious.

Meanwhile, Korean Patent Laid-Open Publication No. 2017-0018739 discloses a lithium secondary battery including an electrolyte containing ethylene fluorophosphite; and a cathode containing LiCoO$_2$; however, the effect of improving stability at a high temperature was extremely small, for example, the swelling phenomenon occurred at a high temperature of 60° C. or higher.

Therefore, a study on an electrolyte additive which inhibits electrolyte oxidation occurring in an interface between a cathode active material and an electrolyte is required, for solving the deteriorated stability at a high temperature when a lithium nickel-based transition metal oxide is used as a cathode active material.

SUMMARY

An embodiment of the present invention is directed to providing an electrolyte for a lithium secondary battery having a minimized thickness increase rate by stabilizing a cathode structure during storage at a high temperature while maintaining good basic performance such as high rate charge-discharge characteristics and life characteristics, and a lithium secondary battery including the same.

In one general aspect, an electrolyte for a secondary battery includes:
 a lithium salt;
 a nonaqueous organic solvent; and a bisfluorophosphite multicyclic compound represented by the following Chemical Formula 1:

[Chemical Formula 1]

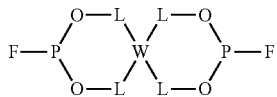

wherein
W is

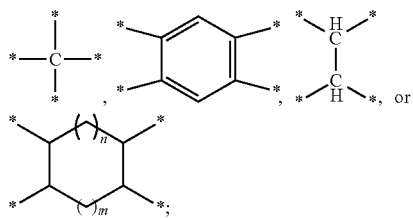

L is a single bond or methylene; and
m is an integer of 1 to 4, and n is an integer of 0 to 2.

In the electrolyte for a lithium secondary battery according to an exemplary embodiment of the present invention, W may be

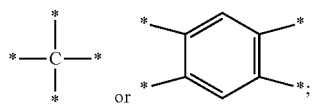

and L may be a single bond or methylene.

In the electrolyte for a lithium secondary battery according to an exemplary embodiment of the present invention, it is preferred that the bisfluorophosphite multicyclic compound may be represented by the following Chemical Formula 2 or 3:

[Chemical Formula 2]

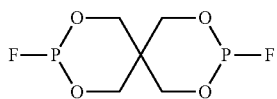

[Chemical Formula 3]

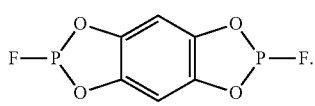

In the electrolyte for a lithium secondary battery according to an exemplary embodiment of the present invention, the bisfluorophosphite multicyclic compound may be included at 0.1 to 5.0 wt % based on a total weight of the electrolyte.

In the electrolyte for a lithium secondary battery according to an exemplary embodiment of the present invention, the electrolyte may further include one or two or more additives selected from the group consisting of an oxalatoborate-based compound, an oxalatophosphate-based compound, a fluorine-substituted carbonate-based compound, a vinylidene carbonate-based compound, and a sulfinyl group-containing compound.

In the electrolyte for a lithium secondary battery according to an exemplary embodiment of the present invention, the electrolyte may further include any one or two or more additives selected from the group consisting of lithium difluoro(oxalato)borate, lithium bis(oxalato)borate, lithium tetrafluoro(oxalato)phosphate, lithium difluoro bis(oxalato)phosphate, fluoroethylene carbonate, difluoroethylene carbonate, fluorodimethyl carbonate, fluoroethyl methyl carbonate, vinylene carbonate, vinyl ethylene carbonate, dimethyl sulfone, diethyl sulfone, ethyl methyl sulfone, methyl vinyl sulfone, divinyl sulfone, ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, 1,3-butylene glycol sulfite, methyl methanesulfonate, ethyl methanesulfonate, methyl ethanesulfonate, propyl methanesulfonate, methyl propanesulfonate, ethyl propanesulfonate, vinyl methanesulfonate, allyl methanesulfonate, vinyl benzene sulfonate, allyl prop-2-ene sulfonate, ethane sultone, 1,3-propane sultone, 1,4-butane sultone, ethene sultone, 1,3-propene sultone, 3-fluoro-1,3-propane sultone, 1,4-butene sultone, ethylene sulfate, propylene sulfate, 2,3-butylene sulfate, 1,3-propylene sulfate, and 1,3-butylene sulfate.

In the electrolyte for a lithium secondary battery according to an exemplary embodiment of the present invention, the additive may be included at 0.1 to 5.0 wt %, based on the total weight of the electrolyte.

In the electrolyte for a lithium secondary battery according to an exemplary embodiment of the present invention, the nonaqueous organic solvent may be selected from the group consisting of a cyclic carbonate-based solvent, a linear carbonate-based solvent, and a mixed solvent thereof; the cyclic carbonate may be selected from the group consisting of ethylene carbonate, propylene carbonate, butylene carbonate, vinylene carbonate, vinyl ethylene carbonate, fluoroethylene carbonate and a mixture thereof; and the linear carbonate may be selected from the group consisting of dimethyl carbonate, diethyl carbonate, dipropyl carbonate, ethyl methyl carbonate, methyl propyl carbonate, methyl isopropyl carbonate, ethyl propyl carbonate, and a mixture thereof.

In the electrolyte for a lithium secondary battery according to an exemplary embodiment of the present invention, the nonaqueous organic solvent may have a mixed volume ratio of the linear carbonate solvent: the cyclic carbonate solvent of 1:1 to 9:1.

In the electrolyte for a lithium secondary battery according to an exemplary embodiment of the present invention, the lithium salt may be one or two or more selected from the group consisting of $LiPF_6$, $LiBF_4$, $LiClO_4$, $LiSbF_6$, $LiAsF_6$, $LiN(SO_2C_2F_5)_2$, $LiN(CF_3SO_2)_2$, $LiN(SO_3C_2F_5)_2$, $LiN(SO_2F)_2$, $LiCF_3SO_3$, $LiC_4F_9SO_3$, $LiC_6H_5SO_3$, $LiSCN$, $LiAlO_2$, $LiAlCl_4$, $LiN(C_xF_{2x+1}SO_2)(C_yF_{2y+1}SO_2)$ (wherein x and y are independently of each other a natural number), $LiCl$, $LiI$, and $LiB(C_2O_4)_2$.

In the electrolyte for a lithium secondary battery according to an exemplary embodiment of the present invention, the lithium salt may be present at a concentration of 0.1 to 2.0 M.

In another general aspect, a lithium secondary battery includes a cathode, an anode, and the electrolyte for a lithium secondary battery of the present invention.

In the lithium secondary battery according to an exemplary embodiment of the present invention, a cathode may include a composite metal oxide of at least one transition metal selected from the group consisting of cobalt, manganese, and nickel with lithium as a cathode active material, and preferably the cathode active material may be a lithium-nickel-cobalt-manganese-based composite oxide.

In the lithium secondary battery according to an exemplary embodiment of the present invention, the lithium-nickel-cobalt-manganese-based composite oxide may be $Li_x(Ni_aCo_bMn_c)O_2$ ($0.5<x<1.3$, $0<a<1$, $0<b<1$, $0<c<1$, and $a+b+c=1$), $Li_x(Ni_aCobMn_c)O4$ ($0.5<x<1.3$, $0<a<2$, $0<b<2$, $0<c<2$, and $a+b+c=2$), or a mixture thereof.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, the present invention will be described in detail. Technical terms and scientific terms used in the present specification have the general meaning understood by those skilled in the art to which the present invention pertains unless otherwise defined, and a description for the known function and configuration which may unnecessarily obscure the gist of the present invention will be omitted in the following description.

"Alkyl" described herein includes both a linear form and a branched form.

"Discharge" described herein means a process in which lithium ions are deintercalated from an anode, and "charge" means a process in which lithium ions are intercalated into an anode.

Hereinafter, the electrolyte for a secondary battery and the lithium secondary battery including the same according to an exemplary embodiment of the present invention will be described in detail.

The present invention relates to an electrolyte for a lithium secondary battery for providing a battery having excellent storage characteristics at a high temperature, and the electrolyte for a secondary battery of the present invention includes: a lithium salt; a nonaqueous organic solvent; and a bisfluorophosphite multicyclic compound represented by the following Chemical Formula 1:

[Chemical Formula 1]

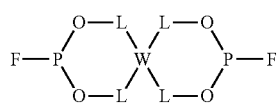

wherein
w is

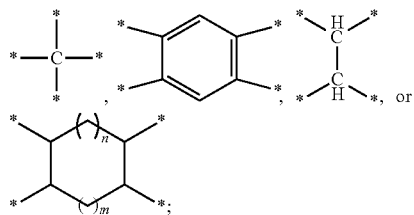

L is a single bond or methylene; and
m is an integer of 1 to 4, and n is an integer of 0 to 2.

The electrolyte for a secondary battery according to the present invention includes the bisfluorophosphite multicyclic compound represented by Chemical Formula 1, thereby having a significantly lowered thickness increase rate at a high temperature, and also, somewhat improved capacity retention rate and capacity recovery rate, and thus, the electrolyte is more stable at a high temperature. More specifically, the compound represented by Chemical Formula 1 has a structure in which two rings containing a fluorophosphite group

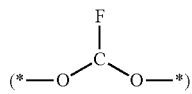

are connected in a spiro or fused form, and thus, lowers resistance of the battery, and also, is coordinately bonded to the transition metal of the cathode to further stabilize the structure of the cathode, thereby minimizing a thickness increase rate at a high temperature.

In the electrolyte for a lithium secondary battery according to an exemplary embodiment of the present invention, preferably W may be

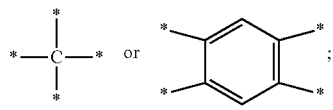 [SMILES: *C(*)(*)* ; *c1cc(*)c(*)cc1*]

and L may be a single bond or methylene, in terms of chemical stability and electrical characteristics.

In the electrolyte for a lithium secondary battery according to an exemplary embodiment of the present invention, the bisfluorophosphite multicyclic compound may be a bisfluorophosphite multicyclic compound represented by the following Chemical Formula 2 or Chemical Formula 3:

[Chemical Formula 2]

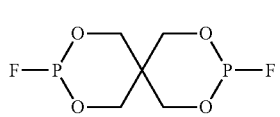

[Chemical Formula 3]

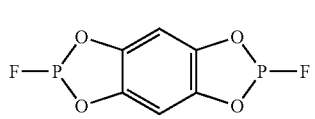

More preferably, in terms of storage characteristics at a high temperature, the bisfluorophosphite multicyclic compound may be the bisfluorophosphite multicyclic compound represented by Chemical Formula 2 having a spiro ring structure.

In the electrolyte for a lithium secondary battery according to an exemplary embodiment of the present invention, in terms of improving stability at a high temperature and a capacity retention rate and preventing deterioration of lithium secondary battery characteristics due to rapid life deterioration occurrence and the like, the bisfluorophosphite multicyclic compound may be included at 0.1 to 5.0 wt %, and in terms of the characteristics at a high temperature, and more preferably the bisfluorophosphite multicyclic compound may be included at 0.5 to 3.0 wt %, based on the total weight of the electrolyte.

In the electrolyte for a lithium secondary battery according to an exemplary embodiment of the present invention, the electrolyte may further include one or two or more additives selected from the group consisting of an oxalatoborate-based compound, an oxalatophosphate-based compound, a fluorine-substituted carbonate-based compound, a vinylidene carbonate-based compound, and a sulfinyl group-containing compound, as a life improving additive for improving a battery life.

The oxalatoborate-based compound may be a compound represented by the following Chemical Formula A or lithium bis(oxalato)borate (LiB($C_2O_4$)$_2$, LiBOB):

[Chemical Formula A]

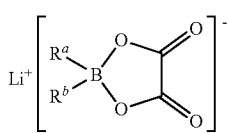

wherein $R^a$ and $R^b$ are independently of each other a halogen or halo$C_1$-$C_{10}$ alkyl.

A specific example of the oxalatoborate-based additive may include lithium difluoro(oxalato)borate (LiB($C_2O_4$)$F_2$, LiDFOB), lithium bis(oxalato)borate (LiB($C_2O_4$)$_2$, LiBOB), or the like.

The oxalatophosphate-based additive may be a compound represented by the following Chemical Formula B or lithium difluoro bis(oxalato)phosphate (LiPF$_2$($C_2O_4$)$_2$, LiDFBOP):

[Chemical Formula B]

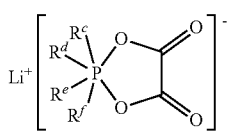

wherein $R^c$ to the $R^f$ are independently of one another a halogen or halo$C_1$-$C_{10}$ alkyl.

A specific example of the oxalatophosphate-based additive may include lithium tetrafluoro(oxalato)phosphate (LiPF$_4$($C_2O_4$). LiTFOP), lithium difluorobis(oxalato)phosphate (LiPF$_2$ ($C_2O_4$)$_2$, LiDFBOP), or the like.

The fluorine-substituted carbonate-based compound may be fluoroethylene carbonate (FEC), difluoroethylene carbonate (DFEC), fluorodimethyl carbonate (FDMC), fluoroethyl methyl carbonate (FEMC), or a combination thereof.

The vinylidene carbonate-based compound may be vinylene carbonate (VC), vinyl ethylene carbonate (VEC), or a mixture thereof.

The sulfinyl group (S=O)-containing compound may be a sulfone compound, a sulfite compound, a sulfonate compound, a sultone compound, or a sulfate compound, and these may be used alone or in combination.

The sulfone compound may be specifically a sulfone compound represented by the following Chemical Formula C:

[Chemical Formula C]

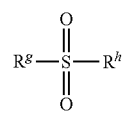

wherein $R^g$ and $R^h$ are independently of each other hydrogen, a halogen, $C_1$-$C_{10}$ alkyl, $C_2$-$C_{10}$ alkenyl, halo$C_1$-$C_{10}$ alkyl, halo$C_2$-$C_{10}$ alkenyl, or $C_6$-$C_{12}$ aryl.

A non-limiting example of the sulfone compound may include dimethylsulfone, diethylsulfone, ethyl methyl sulfone, methyl vinyl sulfone, divinyl sulfone, or the like, but not limited thereto. In addition, these compounds may be used alone or in combination of two or more.

The sulfite compound may be specifically a sulfite compound represented by the following Chemical Formula D:

[Chemical Formula D]

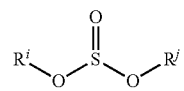

wherein $R^i$ and $R^j$ are independently of each other hydrogen, a halogen, $C_1$-$C_{10}$ alkyl, $C_2$-$C_{10}$ alkenyl, halo$C_1$-$C_{10}$ alkyl, halo$C_2$-$C_{10}$ alkenyl, or $C_6$-$C_{12}$ aryl, or $R^i$ and $R^j$ may be linked by $CR^{100}R^{101}CR^{102}R^{103}$ $(CR^{104}R^{105})_m$— to form a ring; $R^{100}$ to $R^{105}$ are independently of one another hydrogen, $C_1$-$C_{10}$ alkyl or phenyl; and m is an integer of 0 or 1.

A non-limiting example of the sulfite compound may include ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, 1,3-butylene glycol sulfite, or the like, but not limited thereto. In addition, these compounds may be used alone or in combination of two or more.

The sulfonate compound may be specifically a sulfonate compound represented by the following Chemical Formula E:

[Chemical Formula E]

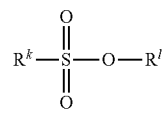

wherein $R^k$ and $R^l$ are independently of each other hydrogen, a halogen, $C_1$-$C_{10}$ alkyl, $C_2$-$C_{10}$ alkenyl, halo$C_1$-$C_{10}$ alkyl, halo$C_2$-$C_{10}$ alkenyl, or $C_6$-$C_{12}$ aryl.

A non-limiting example of the sulfonate compound may include methyl methansulfonate, ethyl methansulfonate, methyl ethansulfonate, propyl methansulfonate, methyl propansulfonate, ethyl propansulfonate, vinyl methansulfonate, allyl methanesulfonate, vinyl benzene sulfonate, allyl prop-2-ene sulfonate, or the like, but not limited thereto. In addition, these compounds may be used alone or in combination of two or more.

The sultone compound may be specifically a sultone compound represented by the following Chemical Formula F:

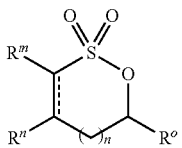

[Chemical Formula F]

wherein === is a single bond or a double bond; $R^m$ to $R^o$ are independently of one another hydrogen, a halogen, $C_1$-$C_{10}$ alkyl, $C_2$-$C_{10}$ alkenyl, halo$C_1$-$C_{10}$ alkyl, halo$C_2$-$C_{10}$ alkenyl, or $C_6$-$C_{12}$ aryl; and n is an integer of 0 to 3.

A non-limiting example of the sultone compound may include ethane sultone, 1,3-propane sultone (PS), 1,4-butane sultone (BS), ethene sultone, 1,3-propene sultone (PES), 3-fluoro-1,3-propane sultone (FPS), 1,4-butene sultone, or the like, but not limited thereto. In addition, these compounds may be used alone or in combination of two or more.

The sulfate compound may be specifically a cyclic sulfate compound represented by the following Chemical Formula G:

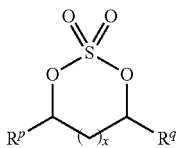

[Chemical Formula G]

wherein $R^p$ and $R^q$ are independently of each other hydrogen, a halogen, $C_1$-$C_{10}$ alkyl, $C_2$-$C_{10}$ alkenyl, halo$C_1$-$C_{10}$ alkyl, halo$C_2$-$C_{10}$ alkenyl, or $C_6$-$C_{12}$ aryl; and x is an integer of 0 to 3.

A non-limiting example of the sulfate compound may include ethylene sulfate (ESA), propylene sulfate, 2,3-butylene sulfate, 1,3-propylene sulfate, 1,3-butylene sulfate, or the like, but not limited thereto. In addition, these compounds may be used alone or in combination of two or more.

In an exemplary embodiment of the present invention, more preferably, the electrolyte may further include one or two or more additives selected from the group consisting of an oxalatoborate-based compound and a sulfinyl group-containing compound, more preferably, the electrolyte may further include one or two or more additives selected from the group consisting of the compound represented by Chemical Formula A, lithium bis(oxalato)borate (LiB($C_2O_4$)$_2$, LiBOB), the sultone compound represented by Chemical Formula F, and the cyclic sulfate compound represented by Chemical Formula G, and still more preferably, the electrolyte may further include a mixture of at least one selected from the group consisting of the compound represented by Chemical Formula A and lithium bis(oxalato)borate (LiB($C_2O_4$)$_2$, LiBOB), the sultone compound represented by Chemical Formula F, and the cyclic sulfate compound represented by Chemical Formula G, as the additive, in terms of the more improved characteristics of the lithium secondary battery including the electrolyte.

In an exemplary embodiment of the present invention, more specifically, the electrolyte may further include two or more additives selected from the group consisting of lithium difluoro(oxalate)borate (LiB($C_2O_4$)$F_2$, LiDFOB), lithium bis(oxalato)borate (LiB($C_2O_4$)2, LiBOB), ethane sultone, 1,3-propane sultone (PS), 1,4-butane sultone (BS), ethene sultone, 1,3-propene sultone (PES), 3-fluoro-1,3-propane sultone (FPS), 1,4-butene sultone, ethylene sulfate (ESA), propylene sulfate, 2,3-butylene sulfate, 1,3-propylene sulfate, and 1,3-butylene sulfate.

More preferably, the electrolyte according to an exemplary embodiment of the present invention may further include lithium bis(oxalato)borate (LiB($C_2O_4$)$_2$, LiBOB), 1,3-propane sultone (PS), ethylene sulfate (ESA), or a mixture thereof, as an additional additive, and it is more preferred to include a mixture of lithium bis(oxalato)borate (LiB($C_2O_4$)$_2$, LiBOB), 1,3-propane sultone (PS), and ethylene sulfate (ESA) in terms of the more improved characteristics of the lithium secondary battery including the electrolyte.

In an exemplary embodiment of the present invention, the content of the additive is not significantly limited, but in order to improve a battery life within the electrolyte for a secondary battery, the additive may be included at 0.1 to 5.0 wt %, and more preferably 0.1 to 3.0 wt %, based on the total weight of the electrolyte.

In the electrolyte for a lithium secondary battery according to an exemplary embodiment of the present invention, the nonaqueous organic solvent may include carbonate, ester, ether, or ketone alone or in combination, and it is preferred that the nonaqueous organic solvent is selected from the group consisting of cyclic carbonate-based solvents, linear carbonate-based solvents, and mixed solvents thereof, and it is most preferred that a mixture of a cyclic carbonate-based solvent and a linear carbonate-based solvent is used. The cyclic carbonate solvent has high polarity so that it may sufficiently dissociate lithium ions, but has a low ion conductivity due to its high viscosity. Therefore, the cyclic carbonate solvent may be mixed with a linear carbonate solvent having low polarity but low viscosity, thereby optimizing the characteristics of the lithium secondary battery.

The cyclic carbonate may be selected from the group consisting of ethylene carbonate, propylene carbonate, butylene carbonate, vinylene carbonate, vinyl ethylene carbonate, fluoroethylene carbonate, and a mixture thereof, and the linear carbonate may be selected from the group consisting of dimethyl carbonate, diethyl carbonate, dipropyl carbonate, ethyl methyl carbonate, methyl propyl carbonate, methyl isopropyl carbonate, ethyl propyl carbonate, and a mixture thereof.

In the electrolyte for a lithium secondary battery according to an exemplary embodiment of the present invention, the nonaqueous organic solvent, which is a mixed solvent of a cyclic carbonate-based solvent and a linear carbonate-based solvent, may be used at a mixed volume ratio between the linear carbonate solvent: the cyclic carbonate solvent of 1:1 to 9:1, and preferably 1.5:1 to 4:1.

In the electrolyte for a lithium secondary battery according to an exemplary embodiment of the present invention, the lithium salt is not limited, but may be one or two or more selected from the group consisting of LiPF$_6$, LiBF$_4$, LiClO$_4$, LiSbF$_6$, LiAsF$_6$, LiN (SO$_2$C$_2$F$_5$)$_2$, LiN (CF$_3$SO$_2$)$_2$, LiN (SO$_3$C$_2$F$_5$)$_2$, LiN (SO$_2$F)$_2$, LiCF$_3$SO$_3$, LiC$_4$F$_9$SO$_3$, LiC$_6$H$_5$SO$_3$, LiSCN, LiAlO$_2$, LiAlCl$_4$, LiN (C$_x$F$_{2x+1}$SO$_2$)

($C_yF_{2y+1}SO_2$) (wherein x and y are independently of each other a natural number), LiCl, LiI, and $LiB(C_2O_4)_2$.

The concentration of the lithium salt is preferably within a range of 0.1 to 2.0 M, and more preferably within a range of 0.7 to 1.6 M. If the concentration of the lithium salt is less than 0.1 M, the conductivity of the electrolyte is lowered so that the performance of the electrolyte is poor, and if the concentration of the lithium salt is above 2.0 M, the viscosity of the electrolyte is increased so that the mobility of lithium ions is reduced. The lithium salt acts as a source of lithium ions in a battery, thereby allowing operation of a basic lithium secondary battery.

The electrolyte for a lithium secondary battery of the present invention is stable usually in a temperature range of —20° C. to 60° C. and maintains electrochemically stable characteristics even at a voltage of 4.2 V, and thus, may be applied to all types of lithium secondary batteries such as a lithium ion battery and a lithium polymer battery.

In particular, the electrolyte for a lithium secondary battery according to an exemplary embodiment of the present invention may be driven even at a voltage of 4.2 V or higher, based on a cathode potential.

In addition, the present invention provides a lithium secondary battery including the electrolyte for a lithium secondary battery according to an exemplary embodiment of the present invention.

A non-limiting example of the secondary battery of the present invention includes a lithium metal secondary battery, a lithium ion secondary battery, a lithium polymer secondary battery, a lithium ion polymer secondary battery, or the like.

The lithium secondary battery manufactured from the electrolyte for a lithium secondary battery according to the present invention is characterized by having a very low battery thickness increase rate of less than 40%, preferably less than 35%, more preferably less than 20%, and still more preferably less than 10%.

The lithium secondary battery of the present invention includes a cathode, an anode, and the electrolyte for a secondary battery according to an exemplary embodiment of the present invention.

Specifically, the cathode according to an exemplary embodiment of the present invention includes a cathode active material capable of intercalating and deintercalating lithium ions, and the cathode active material according to an exemplary embodiment of the present invention is a composite metal oxide of at least one transition metal selected from the group consisting of cobalt (Co), manganese (Mn), and nickel (Ni) with lithium, as a preferred combination with the electrolyte for a lithium secondary battery according to an exemplary embodiment of the present invention, and may be one or two or more selected from the group consisting of a lithium-manganese-based composite oxide, a lithium-cobalt-based composite oxide, a lithium-nickel-based composite oxide, a lithium-nickel-manganese-based composite oxide, a lithium-nickel-cobalt-based composite oxide, a lithium-cobalt-manganese-based composite oxide, and a lithium-nickel-cobalt-manganese-based composite oxide.

In the secondary battery including the cathode including a composite metal oxide of at least one transition metal selected from the group consisting of cobalt (Co), manganese (Mn), and nickel (Ni) with lithium as the cathode active material and the electrolyte for a secondary battery according to an exemplary embodiment of the present invention, the transition metal of the cathode and the bisfluorophosphite multicyclic compound included in the electrolyte are coordinately bonded and further stabilize a cathode structure, thereby inhibiting a side reaction of a cathode surface and the electrolyte during storage at a high temperature to prevent decomposition of the electrolyte, which results in prevention of production of gas to effectively inhibit a swelling phenomenon, and thus, storage stability at a high temperature of the lithium secondary battery may be improved.

A non-limiting example of the cathode active material may include any one or a mixture of two or more selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_x(Ni_aCo_bMn_c)O_2$ ($0.5<x<1.3$, $0<y<1$), $Li_xCo_{1-y}Mn_yO_2$ ($0.5<x<1.3$, $0\leq y<1$), $Li_xNi_{1-y}Mn_yO_2$ ($0.5<x<1.3$, $0\leq 1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$), and $Li_xFePO_4$ ($0.5<x<1.3$).

The cathode active material according to an exemplary embodiment of the present invention may be a lithium-nickel-cobalt-manganese-based composite oxide as the most preferred combination of the electrolyte for a lithium secondary battery according to an exemplary embodiment of the present invention, preferably $Li_x(Ni_aCo_bMn_c)O_2$ ($0.5<x<1.3$, $0<a<1$, $0<b<1$, $0<c<1$, $a+b+c=1$), $Li_x(Ni_aCo_bMn_c)O_4$ ($0.5<x<1.3$, $0<a<2$, $0<b<2$, $0<c<2$, $a+b+c=2$), or a mixture thereof, and more preferably $Li_x(Ni_aCo_bMn_c)O_2$ wherein $0.90\geq x\geq 1.10$, $0.3\geq a\geq 0.8$, $0.1\geq b\leq 0.5$, $0.1\geq c\leq 0.5$, and $a+b+c=1$.

The cathode active material which is preferably combined with the electrolyte for a lithium secondary battery including a bisfluorophosphite multicyclic compound, included in the lithium secondary battery according to an exemplary embodiment of the present invention, particularly the electrolyte for a lithium secondary battery including one or two or more additional additives selected from the group consisting of an oxalatoborate-based compound, an oxalatophosphate-based compound, a fluorine-substituted carbonate-based compound, a vinylidene carbonate-based compound, and a sulfinyl group-containing compound with the bisfluorophosphite multicyclic compound, may be $Li_x(Ni_aCo_bMn_c)O_2$, wherein $0.90\geq x\geq 1.10$, $0.3\geq a\geq 0.8$, $0.1\geq b>0.5$, $0.1\geq c<0.5$, and $a+b+c=1$, and more preferably $Li(Ni_aCo_bMn_c)O_2$, wherein $0.3\geq a\geq 0.8$, $0.1\geq b<0.5$, $0.1\geq c<0.5$, and $a+b+c=1$.

Preferably, the cathode active material according to an exemplary embodiment of the present invention may be $LiNi_{0.6}Co_{0.2}Mn_{0.2}O_2$, $LiNi_{0.5}Co_{0.2}Mn_{0.3}O_2$, $LiNi_{0.8}Co_{0.1}Mn_{0.1}O_2$, $LiNi_{1/3}Co_{1/3}Mn_{1/3}O_2$, or a mixture thereof, and more preferably, may be $LiNi_{0.8}Co_{0.1}Mn_{0.1}O_2$, $LiNi_{1/3}Co_{1/3}Mn_{1/3}O_2$, or a mixture thereof.

The anode includes an anode current collector and an anode active material layer formed on the anode current collector, the anode active material layer includes an anode active material capable of intercalating and deintercalating lithium ions, and as the anode active material, carbon materials such as crystalline carbon, amorphous carbon, a carbon composite, and carbon fiber, a lithium metal, an alloy of lithium and another element, and the like may be used. A non-limiting example of the amorphous carbon includes soft carbon (low-temperature sintered carbon), hard carbon, coke, misocarbon microbeads (MCMB) calcined at 1500° C. or lower, mesophase pitch-based carbon fiber (MPCF), or the like. A non-limiting example of the crystalline carbon includes graphite-based materials, and specifically natural graphite, graphitized coke, graphitized MCMB, graphitized MPCF, or the like. The carbon material is preferably a material in which a d002 interplanar distance is 3.35 Å to 3.38 Å, and LC (crystallite size) by X-ray diffraction is at least 20 nm or more. As other elements forming an alloy with lithium, aluminum, zinc, bismuth, cadmium, antimony, silicon, lead, tin, gallium or indium may be used.

The cathode or the anode may be prepared by dispersing an electrode active material, a binder, a conductive material, and if necessary, a thickener in a solvent to prepare an electrode slurry composition, and applying the slurry composition on an electrode current collector. As a cathode current collector, aluminum, an aluminum alloy, or the like may be often used, and as an anode current collector, copper, a copper alloy, or the like may be often used. The cathode current collector and the anode current collector may be in the form of foil or mesh.

A binder is a material which serves as a paste of the active material, mutual adhesion of the active material, adhesion to the current collector, and buffering effect on expansion and contraction of the active material or the like. For example, the binder includes polyvinylidene fluoride (PVdF), a copolymer of polyhexafluoropropylene-polyvinylidene fluoride (PVdF/HFP), poly(vinyl acetate), polyvinyl alcohol, polyethylene oxide, polyvinyl pyrrolidone, alkylated polyethylene oxide, polyvinyl ether, poly(methyl methacrylate), poly(ethyl acrylate), polytetrafluoroethylene, polyvinyl chloride, polyacrylonitrile, polyvinylpyridine, styrene-butadiene rubber, acrylonitrile-butadiene rubber or the like. The content of the binder is 0.1 to 30 wt %, and preferably 1 to 10 wt %, based on the electrode active material. When the content of the binder is excessively small, adhesion between the electrode active material and the current collector is insufficient. Meanwhile, when the content of the binder is excessively large, adhesion is improved but the content of the electrode active material is reduced accordingly, which is disadvantageous for increasing the battery capacity.

A conductive material is used for imparting conductivity to the electrode, and may be any material as long as it is an electro conductive material without causing any chemical change in the battery constituted. Examples thereof include at least one selected from the group consisting of a graphite-based conductive material, a carbon black-based conductive material, and a metal-based or metal compound-based conductive material. Examples of the graphite-based conductive material include artificial graphite, natural graphite or the like. Examples of the carbon black-based conductive material include acetylene black, ketjen black, denkablack, thermal black, channel black or the like. Examples of the metal-based or metal compound-based conductive material include peroskite materials such as tin, tin oxide, tin phosphate ($SnPO_4$), titanium oxide, potassium titanate, $LaSrCoO_3$, or $LaSrMnO_3$. However, the conductive material is not limited to the materials as listed above.

The content of the conductive material is preferably 0.1 to 10 wt %, based on the electrode active material. When the content of the conductive material is less than 0.1 wt %, based on the electrode active material, electrochemical characteristics are deteriorated, and when the content of the conductive material exceeds 10 wt %, based on the electrode active material, an energy density per weight is decreased.

The thickener is not particularly limited as long as it controls the viscosity of an active material slurry. Examples thereof include carboxymethyl cellulose, hydroxymethyl cellulose, hydroxyethyl cellulose, hydroxypropyl cellulose or the like.

As the solvent in which the electrode active material, the binder, the conductive material or the like is dispersed, a non-aqueous solvent or an aqueous solvent is used. Examples of the non-aqueous solvent include N-methyl-2-pyrrolidone (NMP), dimethylformamide, dimethylacetamide, N,N-dimethylaminopropylamine, ethylene oxide, tetrahydrofuran or the like.

The lithium secondary battery of the present invention may include a separator which prevents a short-circuit between the cathode and the anode and provides a passage for the lithium ion. As such separator, a polyolefin-based polymer membrane such as polypropylene, polyethylene, polyethylene/polypropylene, polyethylene/polypropylene/polyethylene, and polypropylene/polyethylene/polypropylene, or a multi-membrane thereof, a microporous film, woven fabrics, or nonwoven fabrics may be used. In addition, a film coated with a resin having excellent stability may be used for a porous polyolefin film.

The lithium secondary battery of the present invention may be other shapes such as a cylindrical shape, a pouch shape or the like in addition to the square shape. The secondary battery is also suitable for applications requiring high voltage, high output, and high temperature driving such as an electric vehicle in addition to the use of conventional mobile phones, portable computers or the like. In addition, the secondary battery may be used in a hybrid vehicle or the like by being coupled to a conventional internal combustion engine, a fuel battery, a super capacitor or the like, and may be used for electric bicycles, power tools and all other applications requiring high output, high voltage, and high temperature driving.

Hereinafter, Inventive Example and Comparative Examples will be described. However, the following Examples are only a preferred embodiment of the present invention, and the present invention is not limited to the following Examples. It is assumed that the lithium salt is all dissociated so that the concentration of the lithium ion is 1 mol (1.0 M), and a basic electrolyte may be formed by dissolving a corresponding amount of the lithium salt such as $LiPF_6$ in a basic solvent so that the lithium salt is a concentration of 1 mol (1.0 M).

[Example 1] Synthesis of bisfluorophosphite multicyclic compound represented by Chemical Formula 2

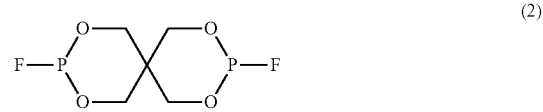

(2)

Pentaerythritol (15.22 g, 111.8 mmol) was dissolved in toluene (90 mL) and pyridine (0.15 mL) was added thereto. Then, phosphorous trichloride (31.48 g, 229.2 mmol) was slowly added and the mixture was stirred at room temperature for 4 hours. A small amount of solid remaining during the reaction was removed by filtration, ammonium fluoride (12.40 g, 334.8 mmol) was added, and the mixture was stirred at 80° C. for 18 hours. A solid produced during the reaction was removed by filtration, and the filtrate was subjected to reduced pressure to remove the solvent, thereby obtaining the bisfluorophosphite multicyclic compound represented by Chemical Formula 2 as a white solid (25.0 g, yield of 96.4%).

$^1$H NMR (500 MHz, $C_6D_6$) δ 4.05 (t, 2 H), 3.71 (d, 2 H), 3.09 (t, 2 H), 2.37 (t, 2 H) ppm

[Examples 2 to 8, and Comparative Examples 1 to 10] Manufacture of lithium secondary battery An electrolyte was prepared by dissolving $LiPF_6$ in a mixed solvent of ethylene carbonate (EC):ethyl methyl carbonate (EMC):diethyl carbonate (DEC) having the volume ratio of 25:45:30 so as to have a 1.0 M solution, as a basic electrolyte (1.0 M LiPF$_6$, EC/EMC/DEC=25/45/30), and further adding components shown in the following Table 1.

A battery to which the non-aqueous electrolyte is applied was manufactured as follows:

LiNi$_{0/8}$Co$_{0.1}$Mn$_{0/1}$O$_2$ were mixed at a weight ratio of 6:4 and used as a cathode active material, polyvinylidene fluoride (PVdF) was used as a binder, and carbon was used as a conductive material. The cathode active material, the binder, and the conductive material were mixed at a weight ratio of 92:4:4, and dispersed in N-methyl-2-pyrrolidone to prepare a cathode slurry. This slurry was coated on an aluminum foil having a thickness of 20 μm, and then dried and rolled to manufacture a cathode.

An artificial graphite as an anode active material, a styrene butadiene rubber (SBR) as a binder, and carboxymethyl cellulose (CMC) as a thickener were mixed at a weight ratio of 96:2:2, and then dispersed in water to prepare an anode slurry. This slurry was coated on a copper foil having a thickness of 15 μm, and then dried and rolled to manufacture an anode.

A cell was configured by stacking a film separator made of polyethylene (PE) and having a thickness of 25 μm between the electrodes thus manufactured, and using a pouch having a size of thickness 8 mm×width 60 mm×length 90 mm, and the non-aqueous electrolyte was injected thereto, thereby manufacturing a 1.7 Ah-class lithium secondary battery.

Performance of the 1.7 Ah-class battery thus manufactured was evaluated as follows, and the results are shown in Table 2 below. Evaluation factors were as follows:

*Evaluation factors*

1. Thickness increase rate after 8 weeks at 60° C.: when the thickness of the battery after being charged at 4.2 V with 1 C CC-CV at room temperature for 3 hours was set as 'A', and the thickness of the battery after being allowed to stand under a exposed normal pressure for 8 weeks in the atmosphere at 60° C. using a closed thermostat was set as 'B', the thickness increase rate was calculated by the following Equation 1. A cell thickness was measured using a flat plate thickness measuring apparatus (manufactured by Misutoyo Corporation, 543-490B).

[Equation 1]

Thickness increase rate (%)=(B−A)/A×100

2. Capacity retention ratio after 8 weeks at 60° C.: a battery was allowed to stand at 60° C. for 8 weeks and then at room temperature for 30 minutes, and calculation was performed by dividing a capacity obtained from 1 C rate CC discharge (2.7 V cut-off) after IR measurement by a capacity measured before storage and the result was shown in a percentage.

Capacity retention rate of battery (%)=(final capacity/initial capacity)×100(%)

3. Capacity recovery rate after 8 weeks at 60° C. (storage efficiency at high temperature): a battery was allowed to stand at 60° C. for 8 weeks and then discharged with a current of 1 C with CC to 2.7 V, and then a usable capacity (%) relative to an initial capacity was measured.

4. Room temperature life: A battery was charged at 4.2 V with 1 C CC-CV at room temperature for 3 hours (0.05 C cut-off), and then discharged at 2.7 V with a current of 1 C to 2.7 V 1000 times repeatedly. In the above all charge-discharge cycles, the operation was paused for 10 minutes after one charge/discharge cycle. The life characteristic was calculated by the capacity retention ratio defined as the following Equation 2:

[Equation 2]

Capacity retention rate (%)=[discharge capacity at 1000$^{th}$ cycle/discharge capacity at 1$^{st}$ cycle]×100

TABLE 1

| Electrolyte composition (total 100 wt %) | |
|---|---|
| Example 2 | Basic electrolyte + 0.5 wt % of bisfluorophosphite multicyclic compound (2) |
| Example 3 | Basic electrolyte + 1.0 wt % of bisfluorophosphite multicyclic compound (2) |
| Example 4 | Basic electrolyte + 2.0 wt % of bisfluorophosphite multicyclic compound (2) |
| Example 5 | Basic electrolyte + 1.0 wt % of bisfluorophosphite multicyclic compound (2) + 0.5 wt % of LiBOB |
| Example 6 | Basic electrolyte + 1.0 wt % of bisfluorophosphite multicyclic compound (2) + 0.5 wt % of PS |
| Example 7 | Basic electrolyte + 1.0 wt % of bisfluorophosphite multicyclic compound (2) + 0.5 wt % of ESA |
| Example 8 | Basic electrolyte + 1.0 wt % of bisfluorophosphite multicyclic compound (2) + 0.5 wt % of LiBOB + 0.5 wt % of PS + 0.5 wt % of ESA |
| Comparative Example 1 | Basic electrolyte |
| Comparative Example 2 | Basic electrolyte + 0.5 wt % of LiBOB + 0.5 wt % of PS + 0.5 wt % of ESA |
| Comparative Example 3 | Basic electrolyte + 1.0 wt % of Comparative Compound A |
| Comparative Example 4 | Basic electrolyte + 1.0 wt % of Comparative Compound B |
| Comparative Example 5 | Basic electrolyte + 1.0 wt % of Comparative Compound C |
| Comparative Example 6 | Basic electrolyte + 1.0 wt % of Comparative Compound D |
| Comparative Example 7 | Basic electrolyte + 1.0 wt % of Comparative Compound C + 0.5 wt % of LiBOB |
| Comparative Example 8 | Basic electrolyte + 1.0 wt % of Comparative Compound C + 0.5 wt % of PS |
| Comparative Example 9 | Basic electrolyte + 1.0 wt % of Comparative Compound C + 0.5 wt % of ESA |
| Comparative Example 10 | Basic electrolyte + 1.0 wt % of Comparative Compound C + 0.5 wt % of LiBOB + 0.5 wt % of PS + 0.5 wt % of ESA |

Basic electrolyte: 1.0M LiPF6, EC/EMC/DEC = 25/45/30

Bisfluorophosphite multicyclic compound (2):

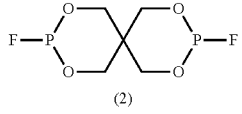 [SMILES: FP1OCC2(CO1)COP(F)OC2]

(2)

(Example 1)

Comparative Compound A:

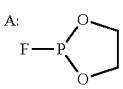

Comparative Compound B:

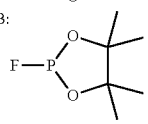

Comparative Compound C:

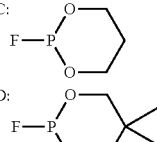

Comparative Compound D:

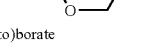

LiBOB: lithium bis(oxalato)borate

PS: 1,3-propane sultone

ESA: ethylene sulfate

TABLE 2

| Lithium secondary battery | After 8 weeks at 60° C. | | | Room temperature life: |
|---|---|---|---|---|
| | Thickness increase rate [%] | Capacity retention rate [%] | Capacity recovery rate [%] | Capacity retention rate [%] |
| Example 2 | 39.2 | 53.1 | 51.0 | 73.3 |
| Example 3 | 30.8 | 58.4 | 56.7 | 75.0 |
| Example 4 | 21.4 | 62.6 | 59.9 | 76.0 |
| Example 5 | 28.2 | 65.4 | 64.3 | 84.6 |
| Example 6 | 15.2 | 68.3 | 68.7 | 76.6 |
| Example 7 | 18.8 | 71.8 | 72.6 | 82.0 |
| Example 8 | 8.7 | 80.3 | 80.7 | 87.7 |
| Comparative Example 1 | 43.3 | 49.1 | 47.8 | 73.0 |
| Comparative Example 2 | 21.1 | 71.2 | 72.0 | 82.3 |
| Comparative Example 3 | 41.0 | 51.0 | 49.1 | 72.1 |
| Comparative Example 4 | 43.7 | 49.7 | 48.4 | 70.8 |
| Comparative Example 5 | 39.0 | 52.4 | 50.8 | 73.9 |
| Comparative Example 6 | 42.4 | 49.4 | 48.3 | 71.1 |
| Comparative Example 7 | 37.0 | 58.7 | 57.0 | 82.9 |
| Comparative Example 8 | 27.3 | 61.1 | 59.8 | 75.5 |
| Comparative Example 9 | 29.9 | 62.4 | 61.8 | 81.1 |
| Comparative Example 10 | 19.1 | 71.4 | 70.2 | 83.9 |

As shown in the above Table 2, it was found that the lithium secondary battery which adopted the electrolyte including the bisfluorophosphite multicyclic compound 2 as a specific additive and included the lithium-nickel-cobalt-manganese-based composite oxide as a cathode active material in a cathode had excellent cycle life characteristics at room temperature, and had a very low thickness increase rate even after being left at 60° C. for 8 weeks, thereby having very high stability at a high temperature.

However, it was found that the lithium secondary batteries of Comparative Examples 1 to 10 which adopted an electrolyte not including the bisfluorophosphite multicyclic compound as a specific additive of the present invention had somewhat low life characteristics, and had a high thickness increase rate after being left at 60° C. for 8 weeks, thereby having significantly deteriorated stability at high temperature and also having greatly deteriorated capacity retention rate and capacity recovery rate.

Thus, it is recognized therefrom that the lithium secondary battery adopting the electrolyte containing the bisfluorophosphite multicyclic compound as a specific additive maintains excellent life characteristics while having a significantly low thickness increase rate at a high temperature, and also has high capacity retention rate and capacity recovery rate, thereby significantly improving stability at a high temperature.

Besides, the electrolyte for a secondary battery including the bisfluorophosphite multicyclic compound as the specific additive of the present invention may further include lithium bis(oxalato)borate (LiBOB), propane sultone (PS), ethylene sulfate (ESA), or a mixture thereof as the additional additive, thereby having improved storage stability at a high temperature and life characteristics.

In particular, the lithium secondary battery which adopts the electrolyte including all of LiBOB, PS, and ESA as the additional additive with the bisfluorophosphite multicyclic compound as the specific additive of the present invention, has more improved stability at a high temperature and life characteristics.

That is, it is recognized that the bisfluorophosphite multicyclic compound which is the specific additive included in the electrolyte for a secondary battery of the present invention is coordinately bonded to nickel, cobalt, and manganese which are the transition metals of the cathode of the lithium secondary battery including the lithium-nickel-cobalt-manganese-based composite oxide as the cathode active material to stabilize the structure of the cathode, whereby a characteristic of inhibiting change in a battery thickness at a high temperature is shown. In addition, it is recognized that when the electrolyte of the present invention is adopted, basic performance such as high-efficiency charge-discharge characteristics is maintained well, while significantly improved life characteristics and excellent high temperature characteristics are shown.

The electrolyte for a lithium secondary battery according to the present invention includes a bisfluorophosphite multicyclic compound, thereby having a significantly lowered thickness increase rate at a high temperature, and also, somewhat improved capacity retention rate and capacity recovery rate, and thus, storage characteristics at a high temperature is excellent.

The electrolyte for a lithium secondary battery according to the present invention includes a bisfluorophosphite multicyclic compound having a structure in which two rings containing a fluorophosphite group

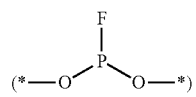

are connected in a spiro or fused form, and thus, lowers resistance of the battery, and also, is coordinately bonded to the transition metal of the cathode more stably and strongly to further stabilize the structure of the cathode, thereby minimizing a thickness increase rate at a high temperature.

That is, the bisfluorophosphite multicyclic compound included in the electrolyte of the present invention stabilizes the structure of the cathode by a coordination bond to nickel, cobalt, or manganese which is the transition metal of the cathode of the lithium secondary battery including a composite metal oxide of at least one transition metal selected from the group consisting of cobalt, manganese, and nickel with lithium as a cathode active material, whereby change in the battery thickness at a high temperature may be significantly inhibited.

That is, the bisfluorophosphite multicyclic compound is coordinately bonded to the transition metal of the cathode to form a protective film having strong binding force on the surface of a cathode active material layer, so that the reaction in the interface between the cathode and the electrolyte is more effectively inhibited, and particularly, a problem that the battery swells due to gas produced by decomposition of the electrolyte at the cathode during storage at a high temperature or continuous charge-discharge may be effectively improved.

In addition, the electrolyte for a lithium secondary battery according to the present invention further includes one or two or more additional additives selected from the group consisting of an oxalatoborate-based compound, an oxalatophosphate-based compound, a fluorine-substituted carbonate-based compound, a vinylidene carbonate-based compound, and a sulfinyl group-containing compound, with the bisfluorophosphite multicyclic compound, thereby having better stability at a high temperature and better life characteristics.

In addition, the lithium secondary battery of the present invention adopts the electrolyte for a secondary battery of the present invention including the bisfluorophosphite multicyclic compound, thereby maintaining basic performance such as high efficiency charge-discharge characteristics and life characteristics well, while showing a significantly low thickness increase rate at a high temperature, and having somewhat high capacity retention rate and capacity recovery rate, thereby having excellent storage stability at a high temperature.

As described above, though the exemplary embodiments of the present invention have been described in detail, a person skilled in the art may make various variations of the present invention without departing from the spirit and the scope of the present invention, as defined in the claims which follow. Accordingly, any modification of the following Examples of the present invention may not depart from the technique of the present invention.

What is claimed is:
1. An electrolyte for a secondary battery, comprising:
a lithium salt;
a nonaqueous organic solvent; and
a bisfluorophosphite multicyclic compound represented by the following Chemical Formula 1:

[Chemical Formula 1]

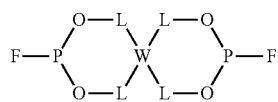

wherein
W is

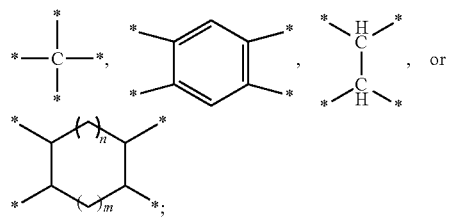

L is a single bond or methylene; and
m is an integer of 1 to 4, and n is an integer of 0 to 2.

2. The electrolyte for a secondary battery of claim 1, wherein W is

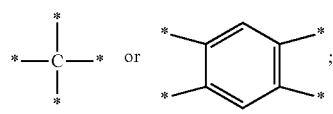 [SMILES: *C(*)(*)* ; *c1cc(*)c(*)cc1*]

and L is a single bond or methylene.

3. The electrolyte for a secondary battery of claim 2, wherein the bisfluorophosphite multicyclic compound is a bisfluorophosphite multicyclic compound represented by the following Chemical Formula 2 or Chemical Formula 3:

[Chemical Formula 2]

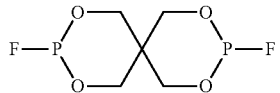

[Chemical Formula 3]

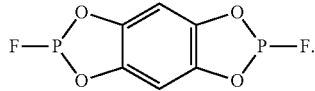

4. The electrolyte for a secondary battery of claim 1, wherein the bisfluorophosphite multicyclic compound is comprised at 0.1 to 5.0 wt %, based on a total weight of the electrolyte.

5. The electrolyte for a secondary battery of claim 1, further comprising: one or two or more additives selected from the group consisting of an oxalatoborate-based compound, an oxalatophosphate-based compound, a fluorine-substituted carbonate-based compound, a vinylidene carbonate-based compound, and a sulfinyl group-containing compound.

6. The electrolyte for a secondary battery of claim 5, further comprising: any one or two or more additives selected from the group consisting of lithium difluoro(oxalato)borate, lithium bis(oxalato)borate, lithium tetrafluoro (oxalato)phosphate, lithium difluoro bis(oxalato)phosphate, fluoroethylene carbonate, difluoroethylene carbonate, fluorodimethyl carbonate, fluoroethyl methyl carbonate, vinylene carbonate, vinyl ethylene carbonate, dimethyl sulfone, diethyl sulfone, ethyl methyl sulfone, methyl vinyl sulfone, divinyl sulfone, ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, 1,3-butylene glycol sulfite, methyl methanesulfonate, ethyl methanesulfonate, methyl ethanesulfonate, propyl methanesulfonate, methyl propanesulfonate, ethyl propanesulfonate, vinyl methanesulfonate, allyl methanesulfonate, vinyl benzene sulfonate, allyl prop-2-ene sulfonate, ethane sultone, 1,3-propane sultone, 1,4-butane sultone, ethene sultone, 1,3-propene sultone, 3-fluoro-1,3-propane sultone, 1,4-butene sultone, ethylene sulfate, propylene sulfate, 2,3-butylene sulfate, 1,3-propylene sulfate, and 1,3-butylene sulfate.

7. The electrolyte for a secondary battery of claim 5, wherein the additive is comprised at 0.1 to 5.0 wt %, based on the total weight of the electrolyte.

8. The electrolyte for a secondary battery of claim 1, wherein the nonaqueous organic solvent is selected from the group consisting of cyclic carbonate-based solvents, linear carbonate-based solvents, and mixed solvents thereof.

9. The electrolyte for a secondary battery of claim 8, wherein the cyclic carbonate is selected from the group consisting of ethylene carbonate, propylene carbonate, butylene carbonate, vinylene carbonate, vinyl ethylene carbonate, fluoroethylene carbonate, and a mixture thereof, and the linear carbonate is selected from the group consisting of dimethyl carbonate, diethyl carbonate, dipropyl carbonate, ethyl methyl carbonate, methyl propyl carbonate, methyl isopropyl carbonate, ethyl propyl carbonate, and a mixture thereof.

10. The electrolyte for a secondary battery of claim 8, wherein the nonaqueous organic solvent has a mixed volume ratio of the linear carbonate solvent to the cyclic carbonate solvent of 1:1 to 9:1.

11. The electrolyte for a secondary battery of claim 1, wherein the lithium salt is one or two or more selected from the group consisting of $LiPF_6$, $LiBF_4$, $LiClO_4$, $LiSbF_6$, $LiAsF_6$, $LiN(SO_2C_2F_5)_2$, $LiN(CF_3SO_2)_2$, $LiN(SO_3C_2F_5)_2$, $LiN(SO_2F)_2$, $LiCF_3SO_3$, $LiC_4F_9SO_3$, $LiC_6H_5SO_3$, $LiSCN$, $LiAlO_2$, $LiAlCl_4$, $LiN(C_xF_{2x+1}SO_2)(C_yF_{2y+1}SO_2)$ (wherein x and y are independently of each other a natural number), $LiCl$, $LiI$, and $LiB(C_2O_4)_2$.

12. The electrolyte for a secondary battery of claim 1, wherein the lithium salt is present at a concentration of 0.1 to 2.0 M.

13. A lithium secondary battery comprising: a cathode, an anode, and the electrolyte for a secondary battery of claim 1.

14. The lithium secondary battery of claim 13, wherein the cathode includes a composite metal oxide of at least one transition metal selected from the group consisting of cobalt, manganese, and nickel with lithium as a cathode active material.

15. The lithium secondary battery of claim 13, wherein the cathode active material is a lithium-nickel-cobalt-manganese-based composite oxide.

16. The lithium secondary battery of claim 15, wherein the lithium-nickel-cobalt-manganese-based composite oxide is $Li_x(Ni_aCo_bMn_c)O_2$ ($0.5<x<1.3$, $0<a<1$, $0<b<1$, $0<c<1$, and $a+b+c=1$), $Li_x(Ni_aCo_bMn_c)O_4$ ($0.5<x<1.3$, $0<a<2$, $0<b<2$, $0<c<2$, and $a+b+c=2$), or a mixture thereof.

* * * * *